United States Patent
Schambre et al.

(10) Patent No.: US 7,341,301 B1
(45) Date of Patent: Mar. 11, 2008

(54) SEAT ASSEMBLY HAVING A STORAGE SYSTEM

(75) Inventors: John E. Schambre, Canton, MI (US); Thomas Drobot, Clarkston, MI (US); Nicol M. Albanese, Plymouth, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/615,051

(22) Filed: Dec. 22, 2006

(51) Int. Cl.
*B60N 3/12* (2006.01)

(52) U.S. Cl. .............................. 296/37.15; 297/188.08; 224/275

(58) Field of Classification Search ............ 296/37.15; 297/188.08; 224/275
See application file for complete search history.

(56) References Cited

U.S. PATENT DOCUMENTS

| | | | | |
|---|---|---|---|---|
| 3,942,691 A | * | 3/1976 | Sisak | 224/275 |
| 4,927,200 A | * | 5/1990 | Wilkins | 296/37.8 |
| 5,065,920 A | | 11/1991 | Amner | |
| 5,957,521 A | * | 9/1999 | Schlachter | 296/37.15 |
| 2006/0006704 A1 | * | 1/2006 | Skelly et al. | 297/188.08 |

* cited by examiner

*Primary Examiner*—Joseph D. Pape
(74) *Attorney, Agent, or Firm*—Ralph E. Smith

(57) ABSTRACT

A storage system is provided for a motor vehicle seat having a seat bottom, the storage system having a pivot rod assembly pivotally attached to the floor of the vehicle at a lower pivot axis by a floor mounting assembly, a storage bin assembly removably secured to a front edge of the seat bottom and pivotally attached to the pivot rod assembly at an upper pivot axis. When a torque load force is placed on the pivot rod assembly about the upper and lower pivot axes the storage bin assembly is biased against the front edge of the seat bottom in a normal closed position. When the torque load force on the pivot rod assembly is overcome, the storage bin assembly moves into an open position.

18 Claims, 2 Drawing Sheets

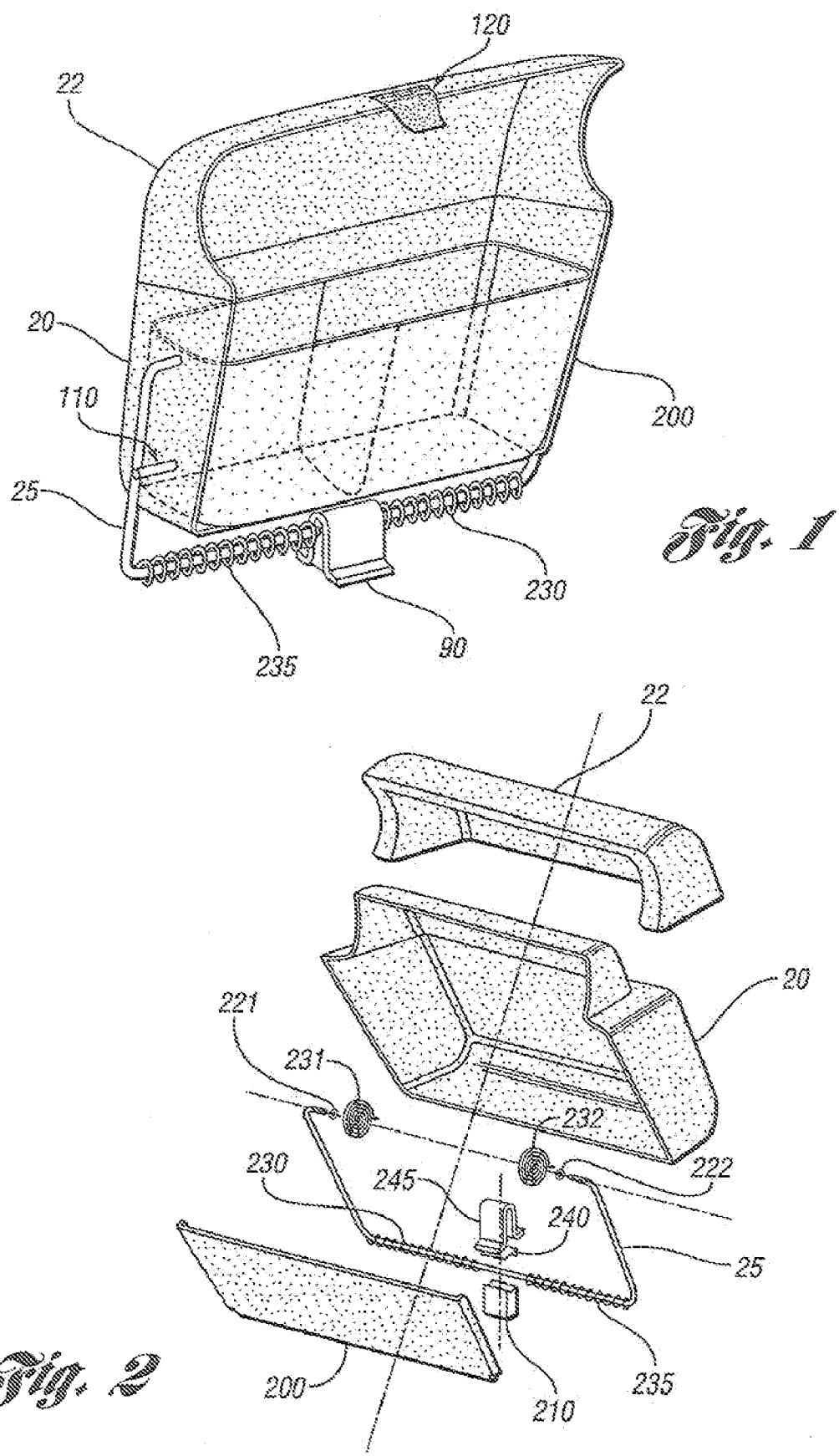

SEAT ASSEMBLY HAVING A STORAGE SYSTEM

FIELD OF THE INVENTION

The present invention relates generally to a seat assembly for a motor vehicle and, more particularly, to seat assembly having a storage bin positioned below the seat.

BACKGROUND OF THE INVENTION

Motor vehicles are typically provided with a variety of storage locations including glove boxes, seat back and side door pockets, consoles located either in the headliner or between the seats, and storage bins located in the trunk or rear cargo area of the vehicle. While many of these storage locations increase the total amount of storage space available to the occupants of the vehicle, there is an increasing demand for more storage.

It is known in the prior art to provide a drawer attached to the bottom of a seat assembly that may be moved relative to the floor beneath the seat to facilitate loading and unloading. For example, U.S. Pat. No. 5,065,920 to Amner, discloses the use of a tray mounted on rails beneath a seat assembly to enable the storage tray to slide forward from beneath the seat for accessibility. However, one drawback of such an arrangement is that the tray typically extends underneath substantially the entire length of the seat. This utilization of the space beneath the seat interferes with the ability to provide additional functionality within such seat assemblies such as, for example, seat occupant sensing capability.

SUMMARY OF THE INVENTION

In accordance with the present invention, a storage system is provided for a motor vehicle seat having a seat bottom, the storage system having a pivot rod assembly pivotally attached to the floor of the vehicle at a lower pivot axis by a floor mounting assembly, a storage bin assembly removably secured to a front edge of the seat bottom and pivotally attached to the pivot rod assembly at an upper pivot axis. When a torque load force is placed on the pivot rod assembly about the upper and lower pivot axes the storage bin assembly is biased against the front edge of the seat bottom in a normal closed position. When the torque load force on the pivot seat assembly is overcome, the storage bin assembly moves into an open position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a seat storage bin assembly according to an exemplary embodiment of the present invention;

FIG. 2 is an exploded, perspective view of a seat storage bin assembly according to an exemplary embodiment of the present invention;

DETAILED DESCRIPTION OF THE PREFERRED EMBODIMENTS

Figure 3:
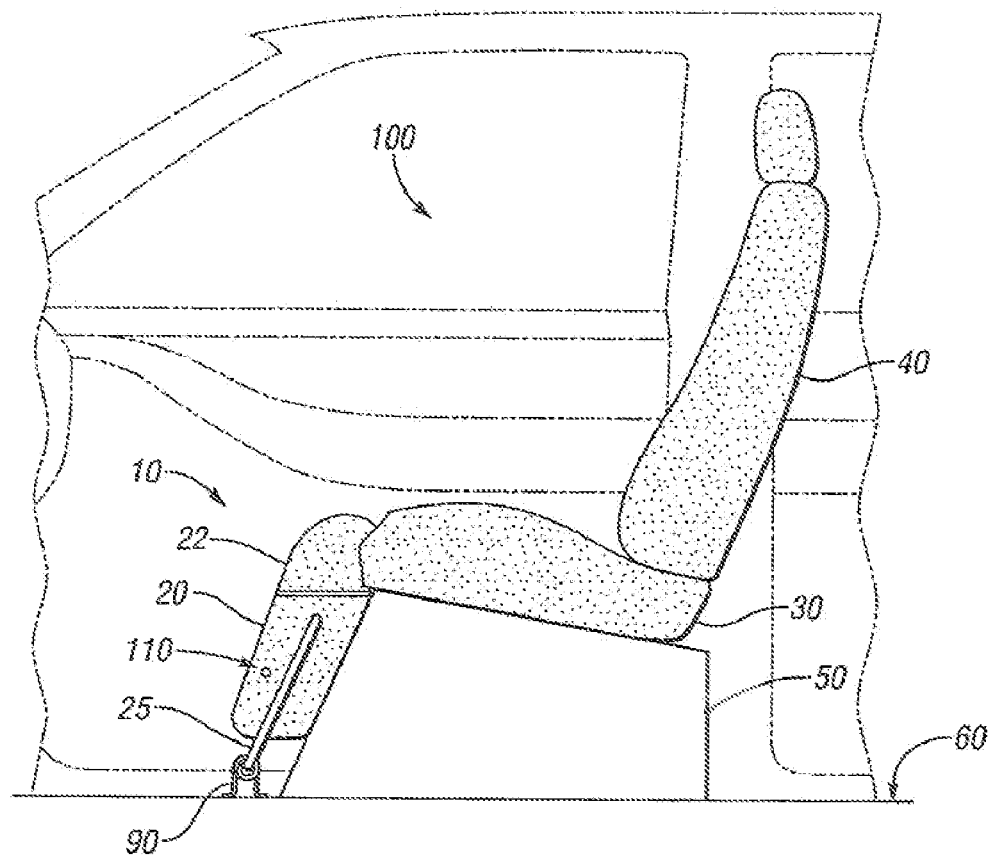
FIG. 3 is a side view of a vehicle having a seat assembly according to an exemplary embodiment of the present invention.

Referring to the drawings, wherein like reference numerals refer to like elements, FIGS. 1 and 2 show a seat storage bin assembly, shown generally by numeral 10, in accordance with one embodiment of the present invention. As shown in FIG. 3, the seat storage bin assembly 10 includes a seat 100 with a seat from 50, a seat bottom 30 with forward and rearward ends coupled to the seat frame 50, and a seat back 40 pivotally coupled to the rearward end of the seat bottom 40. The seat storage bin assembly 10 is detachably latched to the forward end of the seat bottom 40 and adapted to support the upper and lower legs of a seat occupant (not shown). Seat storage bin assembly 10 is further pivotally coupled to the floor 60 of the vehicle by a pivot rod assembly, shown generally by numeral 70.

In an exemplary embodiment, the seat storage bin assembly 10 further includes a bin 20 having two vertically extending sidewalls and vertically extending front wall with an outer top portion, a foam pad and skin 22 attached to the outer top portion of the vertically extending front wall of the bin 20, and a cover 200 adapted to be secured to the vertically extending sidewalls of the bin 20 opposite the vertically extending front wall. However, those skilled in the art will recognize that a number of alternative configurations of seat storage bin assembly arrangements may be utilized.

In an exemplary embodiment, the pivot rod assembly 70, as best shown in FIG. 2, comprises a generally C-shaped rod 25 having end sections that connect to the storage bin 20. Upper pivot springs 231 and 232 are attached to the end sections of the rod 25 and the storage bin 20 to pivotally coupled the pivot rod assembly 70 to the seat storage bin assembly 10. Finally, spacer members 221 and 222 may be attached to the end sections of the rod 25 to prevent the upper pivot springs 231 and 232 from engaging the rod 25 in an undesired manner. The pivot rod assembly 70 is connected to the floor 60 of the vehicle 100 by a floor mounting assembly, shown generally by numeral 90. Alternatively, the pivot rod assembly 70 could be connected to a lower portion of the seat assembly, such as a slider or riser bracket. The floor mounting assembly 90 includes a mounting bracket 245 which attaches an upper 240 and lower pivot block 210 to the floor 60 of the vehicle 100. The upper 240 and lower pivot block 210 enclose the rod 25 and operate in conjunction with lower pivot springs 230 and 235 connected to the middle section of the rod 25 to pivotally connect the rod 25 to the floor 60 of the vehicle 100.

Figure 4:
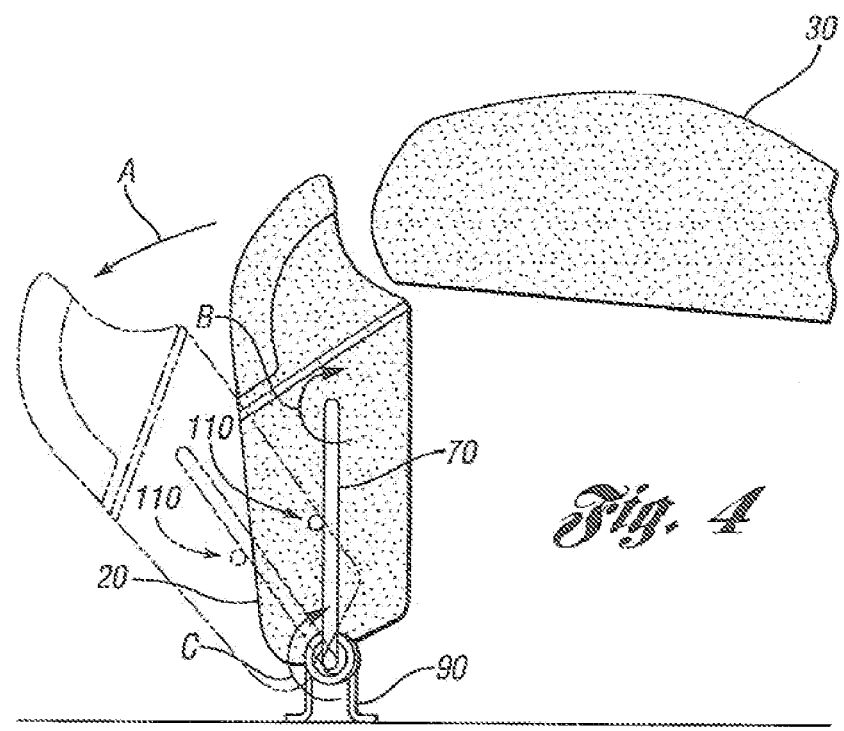
FIG. 4 is a side view of a seat assembly having a storage bin according to an exemplary embodiment of the present invention.

In the exemplary embodiment, as best shown in FIGS. 3 and 4, the seat storage bin assembly 10 is normally biased against the forward end of the seat bottom 30 by, and capable of rotation about, two pivotal attachments. First, the seat storage bin assembly 10 is pivotally attached to the pivot rod assembly 70 at an upper pivot point approximately two thirds up from the floor 60. This pivotal connection is arranged to provide a torque load force biasing the seat storage bin assembly 10 about the upper pivot point in the direction of arrow B. Second, the pivot rod assembly 70 is pivotally attached to the floor 60 at a lower pivot point through the floor mounting assembly 90. This pivotal connection is arrange to provide a torque load force biasing the seat storage bin assembly 10 about the lower pivot point in the direction of arrow C. When the seat storage bin assembly 10 is arranged according to this exemplary embodiment, the storage bin 20 may be accessed by an occupant of the vehicle 100 placing a hand on the top of the seat storage bin assembly 10 at the forward end of the seat bottom 30 and rotating the seat storage bin assembly 10 forward in the vehicle 100 in the direction of arrow A into an open position. Access to the storage bin 20 will be provided by inserting or removing objects into the storage bin 20 through the space between the seat storage bin assembly 10 and the seat bottom 30. To prevent the seat storage bin assembly 10 from over-rotating in the direction of arrow A in an undesirable manner, a simple rotation stop 110 can be molded into the outside of the storage bin 20. When the occupant of the vehicle releases the seat storage bin assembly 10, the spring bias will move the seat storage bin assembly 10 back to its normal closed position wherein the seat storage bin assembly 10 is biased against the forward edge of the seat bottom 30.

Finally, the seat storage bin assembly 10 may contain a fastener arrangement arranged to retain the seat storage bin assembly 10 in its normal closed position. In an exemplary embodiment, as shown in FIG. 1, the fastener arrangement may consist of a small piece of Velcro material may be mounted on an elastic flap 120 attached the seat storage bin assembly 10 and the seat bottom 30. However, those skilled in the art will recognize that a number of alternative fastener arrangements may be utilized.

In the illustrated embodiment, the weight of the seat storage bin assembly 10 and any objects contained within the seat storage bin assembly 10 are supported by the floor 60 of the vehicle 100 through the use of the pivot rod assembly 70, as opposed to being supported by the seat assembly. Pursuant to this exemplary embodiment, the seat storage bin assembly 10 is well suited for use in conjunction with a seat assembly utilizing an Occupant Certification System ("OCS") Seat System, which detects the size of an occupant seated in the seat assembly via a series of load cells located beneath the seat bottom 30. However, those skilled in the art will recognize that the seat storage bin assembly 10 may be used in conjunction with any number of alternative seat assembly arrangements.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A storage system for a motor vehicle seat having a seat bottom, the storage system comprising:
    a pivot rod assembly pivotally attached to a floor of the vehicle at a lower pivot axis;
    a storage bin assembly to engage a front edge of said seat bottom, and pivotally attached to said pivot rod assembly at an upper pivot axis; and
    a biasing mechanism arranged to place a torque load force on said pivot rod assembly about said upper and lower pivot axes to bias said storage bin assembly against said front edge of said seat bottom in a normal closed position, said biasing mechanism arranged such that a user can overcome the torque load force on said pivot rod assembly to rotate the storage bin assembly into an open position.

2. The storage system of claim 1 wherein said pivot rod assembly further comprises:
    a C-shaped rod having end sections coupled to said storage bin assembly; and
    wherein the biasing mechanism comprises upper pivot springs positioned at said end sections of said rod and arranged to provide a torque load force on said rod to bias said storage bin to the closed position.

3. The storage system of claim 1 further comprising a latch arrangement coupled to said storage bin assembly to said seat bottom to allow the bin assembly to be releasably coupled to the seat bottom.

4. The storage system of claim 1 wherein said floor mounting assembly further comprises:
    lower pivot springs attached to said pivot rod assembly;
    an upper and a lower pivot block adapted to enclose said pivot rod assembly, said lower pivot springs attached to said upper and lower pivot block and
    a mounting bracket arranged to secure said upper and lock pivot block and said pivot rod assembly to said floor.

5. The storage system of claim 1 wherein said storage bin assembly further comprises:
    a bin having two vertically extending sidewalls and one vertically extending frontwall having an outer top portion;
    a foam pad and skin attached to said outer top portion of said vertically extending frontwall of said bin;
    a cover adapted to be secured to said vertically extending sidewalls of said bin opposite said vertically extending frontwall.

6. The storage system of claim 1 further comprising a stop member attached to the storage bin assembly and arranged to prevent forward rotation of said storage bin assembly.

7. A seat assembly for a motor vehicle having a floor, the seat assembly comprising:
    a seat frame coupled to said floor, said seat frame coupled to a seat bottom;
    a pivot rod assembly pivotally attached to said floor at a lower pivot axis by a floor mounting assembly;
    a storage bin assembly removably secured to a front edge of said seat bottom;
    said storage bin assembly further pivotally attached to said pivot rod assembly at a upper pivot axis; and
    wherein a torque load force is placed on said pivot rod assembly about said upper and lower pivot axes to bias said storage bin assembly against said front edge of said seat bottom in a normal position and when said torque load force on said pivot rod assembly is overcome access to the storage bin assembly in an open position is provided.

8. The seat assembly of claim 7 wherein said pivot rod assembly further comprises:
    a C-shaped rod having end sections adapted to be attached to said storage bin assembly;
    upper pivot springs attached to said end sections of said rod and said storage bin, wherein said upper pivot springs provide a torque load force between said rod and said storage bin.

9. The seat assembly of claim 7 further comprising a fastener arrangement adapted to removably secure said storage bin assembly to said seat bottom.

10. The seat assembly of claim 7 wherein said floor mounting assembly further comprises:
    lower pivot springs attached to said pivot rod assembly;
    an upper and a lower pivot block adapted to enclose said pivot rod assembly, said lower pivot springs attached to said upper and lower pivot block; and a mounting bracket arranged to secure said upper and lower pivot block and said pivot rod assembly to said floor.

11. The seat assembly of claim 7 wherein said storage bin assembly further comprises:
- a bin having two vertically extending sidewalls and one vertically extending frontwall having an outer top portion;
- a foam pad and skin attached to said outer top portion of said vertically extending frontwall of said bin;
- a cover adapted to be secure to said vertically extending sidewalls of said bin opposite said vertically extending frontwall.

12. The seat assembly of claim 7 further comprising a stop member attached to the storage bin assembly and arranged to prevent forward rotation of said storage bin assembly.

13. A vehicle, the vehicle comprising:
- a floor;
- a seat frame coupled to said floor, said seat frame coupled to a seat bottom;
- a pivot rod assembly pivotally attached to said floor at a lower pivot axis by a floor mounting assembly;
- a storage bin assembly removably secured to a front edge of said seat bottom;
- said storage bin assembly further pivotally attached to said pivot rod assembly at a upper pivot axis; and
- wherein a torque load force is placed on said pivot rod assembly about said upper and lower pivot axes to bias said storage bin assembly against said front edge of said seat bottom in a normal position and when said torque load force on said pivot rod assembly is overcome access to the storage bin assembly in an open position is provided.

14. The vehicle of claim 13 wherein said pivot rod assembly further comprises:
- a C-shaped rod having end sections adapted to be attached to said storage bin assembly;
- upper pivot springs attached to said end sections of said rod and said storage bin, wherein said upper pivot springs provide a torque load force between said rod and said storage bin.

15. The seat assembly of claim 13 further comprising a fastener arrangement adapted to removably secure said storage bin assembly to said seat bottom.

16. The seat assembly of claim 13 wherein said floor mounting assembly further comprises:
- lower pivot springs attached to said pivot rod assembly;
- an upper and a lower pivot block adapted to enclose said pivot rod assembly, said lower pivot springs attached to said upper and lower pivot block; and
- a mounting bracket arranged to secure said upper and lower pivot block and said pivot rod assembly to said floor.

17. The seat assembly of claim 13 wherein said storage bin assembly further comprises:
- a bin having two vertically extending sidewalls and one vertically extending frontwall having an outer top portion;
- a foam pad and skin attached to said outer top portion of said vertically extending frontwall of said bin;
- a cover adapted to be secured to said vertically extending sidewalls of said bin opposite said vertically extending frontwall.

18. The seat assembly of claim 13 further comprising a stop member attached to the storage bn assembly and arranged to prevent forward rotation of said storage bin assembly.

\* \* \* \* \*